(12) United States Patent
Cage

(10) Patent No.: US 6,439,060 B1
(45) Date of Patent: Aug. 27, 2002

(54) DYNAMIC COUNTERBALANCE FOR CORIOLIS MASS FLOWMETERS

(75) Inventor: Donald R. Cage, Longmont, CO (US)

(73) Assignee: FMC Technologies, Inc., Chicago, IL (US)

(*) Notice: Subject to any disclaimer, the term of this patent is extended or adjusted under 35 U.S.C. 154(b) by 0 days.

(21) Appl. No.: 09/687,292

(22) Filed: Oct. 13, 2000

Related U.S. Application Data

(60) Provisional application No. 60/159,487, filed on Oct. 14, 1999.

(51) Int. Cl.[7] .................................................. G01F 1/84
(52) U.S. Cl. .............................. 73/861.357; 73/861.355
(58) Field of Search ..................... 73/861.357, 195, 73/861.12, 861.66, 861.75, 861.355

(56) References Cited

U.S. PATENT DOCUMENTS

| | | | | |
|---|---|---|---|---|
| 4,823,614 A | * | 4/1989 | Dahlin | 73/861.38 |
| 4,895,030 A | * | 1/1990 | Bergamini et al. | 73/861.38 |
| 5,398,554 A | * | 3/1995 | Ogawa et al. | 73/861.38 |
| 5,488,870 A | * | 2/1996 | Yoshimura et al. | 73/861.38 |
| 5,796,012 A | * | 8/1998 | Gomi et al. | 73/861.357 |
| 5,969,265 A | * | 10/1999 | Van Cleeve et al. | 73/861.357 |

FOREIGN PATENT DOCUMENTS

EP 0 598 287 A1 5/1994

* cited by examiner

Primary Examiner—Benjamin R. Fuller
Assistant Examiner—Lilybett Martir
(74) Attorney, Agent, or Firm—Henry C. Query, Jr.

(57) ABSTRACT

The present invention is directed to a counterbalance apparatus for a Coriolis-type mass flowmeter having a flowtube through which a fluid to be measured is permitted to flow, the counterbalance apparatus comprising a counterbalance beam which is coupled to the ends of the flowtube; a force driver for vibrating the flowtube and the counterbalance beam in opposition to one another; at least one pair of inertial masses, each of which is movably coupled to the counterbalance beam; and an apparatus for selectively positioning the inertial masses longitudinally along the counterbalance beam; wherein the frequency response of the counterbalance beam can be selectively altered by appropriately positioning the inertial masses along the counterbalance beam to thereby achieve a desired condition of balance between the counterbalance beam and the flowtube.

19 Claims, 7 Drawing Sheets

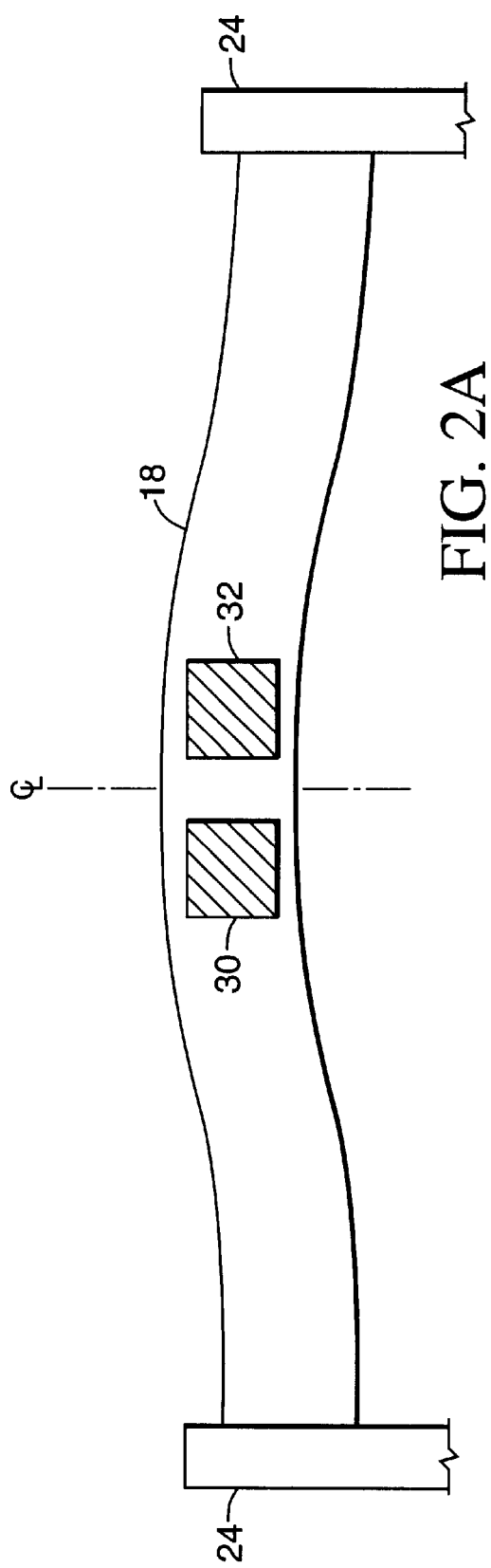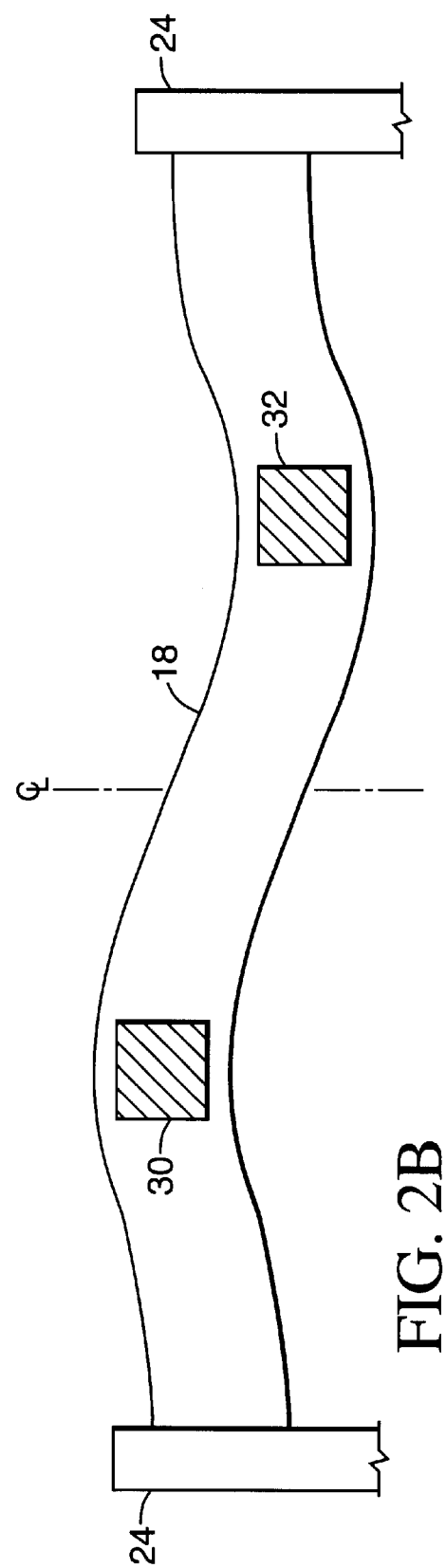

FIG. 3
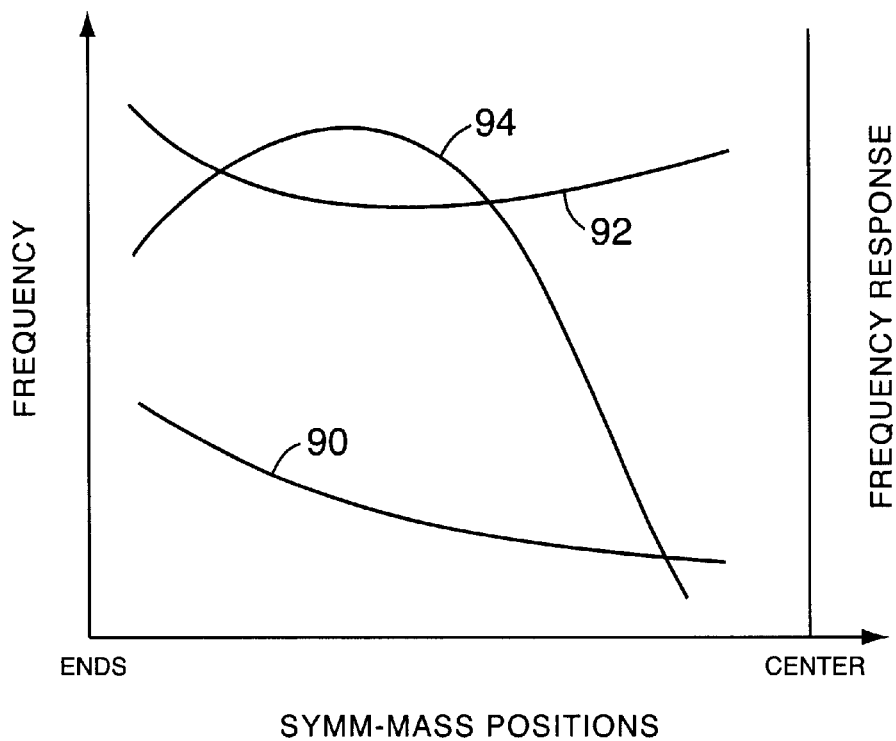
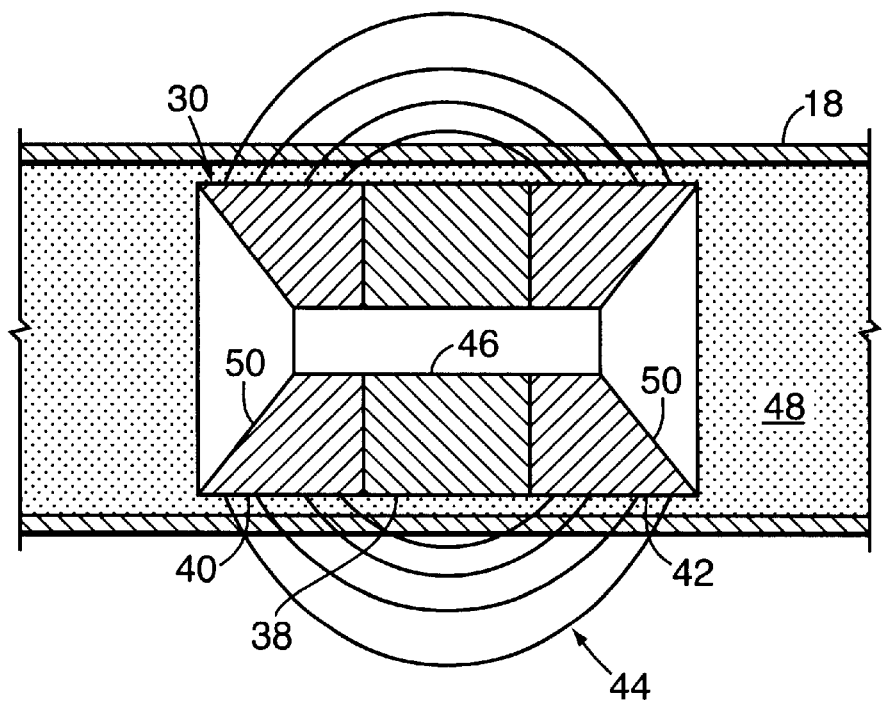
FIG. 4

DYNAMIC COUNTERBALANCE FOR CORIOLIS MASS FLOWMETERS

This application is based on United States Provisional Patent Application No. 60/159,487, which was filed on Oct. 14, 1999.

BACKGROUND OF THE INVENTION

The present invention relates to Coriolis-type mass flowmeters having one or more flowtubes through which a fluid to be measured is permitted to flow. More particularly, the invention relates to an apparatus and method for balancing the flowtube over all conditions and frequencies to which the flowtube may be subjected during operation of the flowmeter.

Prior art Coriolis mass flowmeters typically include one or more flowtubes through which a fluid to be measured is directed, a number of force drivers for vibrating the flowtube in one of its modes of vibration, and one or more sensors for measuring the vibratory deflections of the flowtube. During normal operation of the flowmeter, the flowtube experiences two types of vibratory deflections: a primary or driven deflection, which is induced by the force drivers through the application of sinusoidal forces at the natural frequency of the flowtube in, for example, its $1^{st}$ bending mode of vibration, and a secondary or Coriolis deflection, which is induced by the Coriolis forces that are generated by the mass of the fluid flowing through the vibrating flowtube. When the flowtube is driven in its $1^{st}$ bending mode of vibration, the resulting Coriolis deflection typically resembles the $2^{nd}$ bending mode of vibration of the flowtube. In order to obtain the mass flow rate of the fluid, the Coriolis deflection is measured by the sensors, and from this measurement the flow rate of the fluid can be derived in a manner that is well understood by those skilled in the art.

The flowtube of the typical Coriolis mass flowmeter is securely connected to a supporting structure, such as the process piping, through end connections which are welded or otherwise attached to the flowtube. The other components of the flowmeter, such as the processing and control circuitry and the flowmeter housing, are likewise coupled to the flowtube through these end connections. The supporting structure and the other components of the flowmeter define the boundary conditions for the flowtube which typically influence the operation of the flowmeter. In the absence of an effective counterbalance, the vibrating flowtube will react against the supporting structure and the other components of the flowmeter through the end connections. The reaction forces created by the vibrating flowtube at the end connections can excite the supporting structure and the other components of the flowmeter and thereby drain energy from the vibrating flowtube and create erroneous flow rate readings. Therefore, the prior art has long recognized a need for a counterbalance mechanism to balance the flowtube during operation of the flowmeter.

The condition of balance between a flowtube and a counterbalance mechanism requires that the reaction forces from each be equal and opposite, thereby canceling each other at the point where the two structures are coupled together. This will result in the vibration of the system, that is, the vibration of the flowtube and the counterbalance, being contained and therefore isolated from any changes in the boundary conditions or the parameters of the fluid being measured. To achieve this condition of balance, the counterbalance must be able to change its natural frequency and frequency response to match those of the flowtube, which can change drastically in response to changing fluid parameters such as temperature, density, pressure and viscosity. Moreover, to achieve the best condition of balance the counterbalance should match the reaction forces at the ends of the flowtube by equal and opposite forces for not only the primary vibratory deflection of the flowtube, but also the secondary vibratory deflection resulting from the Coriolis forces.

The prior art has developed several counterbalance mechanisms in an attempt to effectively balance the flowtube. For example, one prior art flowmeter includes a fixed counterbalance which is similar in shape to the flowtube, is coupled to the flowtube proximate the end connections and includes weights to simulate the density of the fluid to be measured. Thus, when the flowtube is vibrated against this counterbalance, the reaction forces generated by the counterbalance will nullify the reaction forces from the flowtube at the end connections. However, this counterbalance is limited in its ability to match the flowtube over changes in the boundary conditions and the fluid parameters.

Another prior art flowmeter comprises two identical parallel flowtubes which are coupled at the end connections. The fluid to be measured is directed through both flow tubes and the flowtubes are vibrated in opposition to each other. Consequently, the tubes remain in near perfect balance regardless of changes in the parameters of the fluid being measured. However, splitting the flow stream into two paths can create a pressure loss and turbulence in the flow stream and can also result in one flowtube becoming plugged.

SUMMARY OF THE INVENTION

The present invention addresses these and other limitations in the prior art by providing a counterbalance apparatus for a Coriolis-type mass flowmeter which includes a flowtube having first and second ends, the counterbalance apparatus comprising a counterbalance beam which is coupled to the flow tube proximate the first and second ends, means for vibrating the flowtube and the counterbalance beam in opposition to one another, at least one pair of inertial masses, each of which is movably coupled to the counterbalance beam, and means for selectively positioning the inertial masses along the length of the counterbalance beam. In this manner, the frequency response of the counterbalance beam can be selectively altered by appropriately positioning the inertial masses along the counterbalance beam to thereby achieve a desired condition of balance between the counterbalance beam and the flowtube.

In the preferred embodiment of the invention, the counterbalance beam comprises an elongated tube which, with the inertial masses coupled to the counterbalance beam in an initial position, is designed to have a mass and stiffness distribution along its length which are similar to those of the flowtube for a given condition, such as when the flowtube is filled with air. The counterbalance beam will therefore vibrate in a similar fashion, at the same frequency, and in opposition to the flowtube and thereby generate equal and opposite reaction forces at the first and second ends of the flowtube, which will result in a balanced condition between the counterbalance beam and the flowtube. If the flowmeter becomes unbalanced, for example in response to a change in the fluid parameters, the inertial masses can be moved to new positions along the counterbalance beam to thereby alter its natural frequency and frequency response as necessary to match that of the flowtube. By controlling the positions of the masses, the requisite condition of balance can thus be restored "on the fly" over any desired range of fluid conditions.

In one embodiment of the invention, the counterbalance beam comprises a non-magnetic metal tube and each inertial mass comprises a cylindrical magnet which is slidably disposed within the tube. In addition, the inertial mass positioning means preferably comprises a number of electrical coils disposed around the counterbalance beam for generating electromagnetic fields which can selectively move the masses in order to position them for optimal balance. Furthermore, the counterbalance apparatus also preferably employs a feedback control means so that, as the natural frequency and frequency response of the flowtube change, the electrical coils can be activated to move the masses to new positions in order to maintain the counterbalance beam in optimal balance with the flowtube.

These and other objects and advantages of the present invention will be made apparent from the following detailed description, with reference to the accompanying drawings. In the drawings, the same reference numbers are used to denote similar components in the various embodiments.

BRIEF DESCRIPTION OF THE DRAWINGS

FIG. 2A is a representation of the counterbalance beam component of the counterbalance apparatus of FIG. 1 shown vibrating in its $1^{st}$ bending mode of vibration, the vibratory deflections being greatly exaggerated for clarity;

FIG. 2B is a representation of the counterbalance beam component of the counterbalance apparatus of FIG. 1 shown vibrating in its $2^{nd}$ bending mode of vibration, the vibratory deflections being greatly exaggerated for clarity;

FIG. 3 is a graph of the relationship between the position of a single pair of inertial masses of the counterbalance apparatus of FIG. 2 and the corresponding $1^{st}$ bending mode frequency, $2^{nd}$ bending mode frequency, and frequency response of the counterbalance beam;

FIG. 4 is a cross sectional view of one embodiment of the inertial mass component of the counterbalance apparatus of the present invention;

DETAILED DESCRIPTION OF THE PREFERRED EMBODIMENTS

Figure 1:
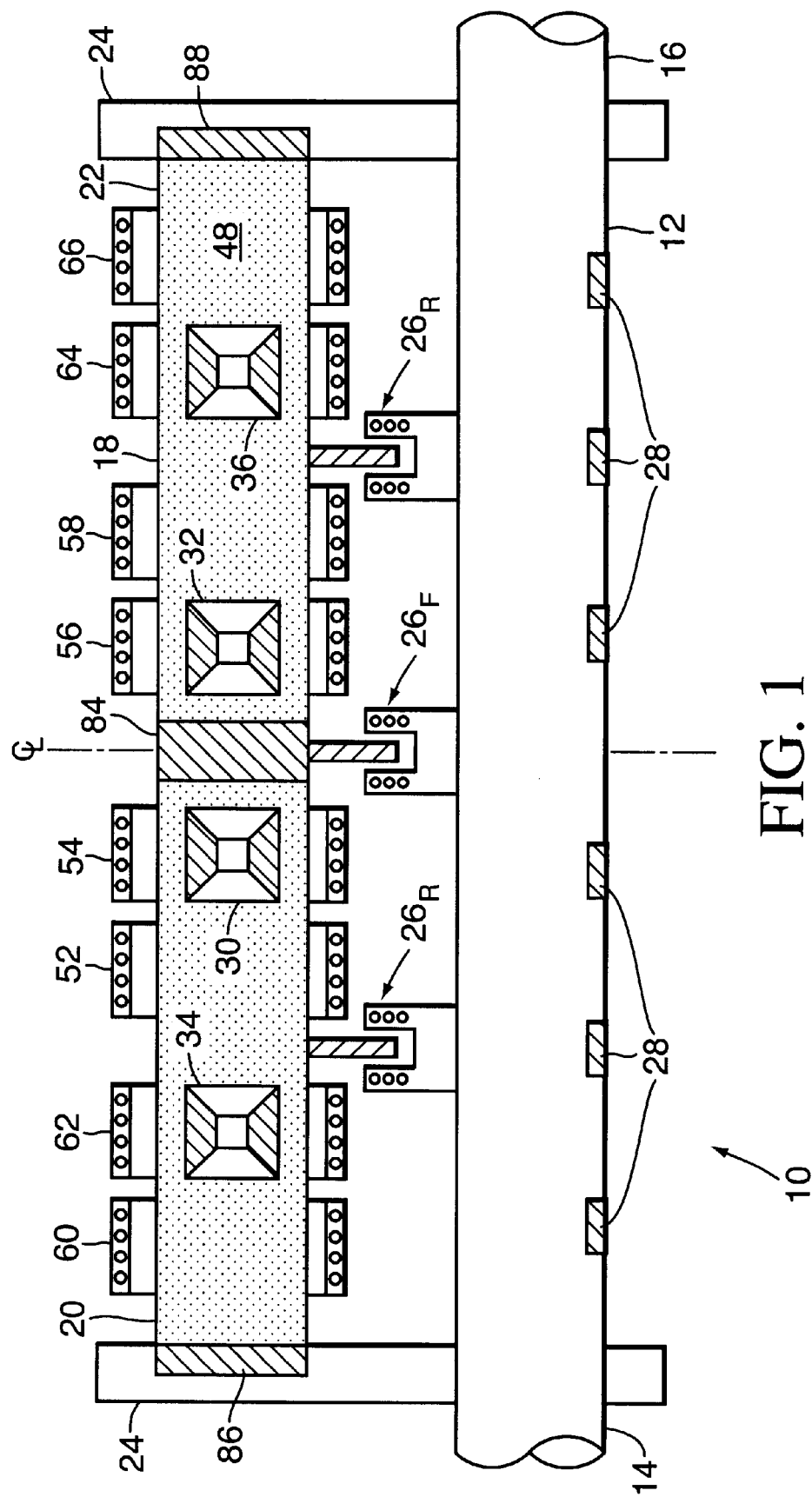
FIG. 1 is a cross sectional view of one embodiment of the counterbalance apparatus of the present invention shown installed on a single straight flowtube of an exemplary Coriolis mass flowmeter.

Referring to FIG. 1, one embodiment of a counterbalance apparatus according to the present invention is shown installed in an exemplary Coriolis mass flowmeter 10 having a single straight metallic flowtube 12 through which a fluid to be measured is directed. The flowtube includes first and second ends 14 and 16, respectively, to which end connections such as conventional pipe flanges (not shown) are affixed to enable to flowtube to be securely attached to a supporting structure, for example the process piping through which the fluid normally flows. As is well understood in the art, the flowmeter 10 may also comprise processing and control circuitry and a housing (neither of which are shown), which are typically connected to the end connections or the flowtube 12 adjacent the first and second ends 14, 16. While the present invention will be describe herein with reference to the exemplary single straight flowtube Coriolis mass flowmeter shown in FIG. 1, it should be understood that the invention may be equally useful in other types of Coriolis mass flowmeters.

The counterbalance apparatus shown in FIG. 1 comprises a tubular counterbalance beam 18 having first and second ends 20, 22, each of which is attached to a coupling 24 which in turn is fixedly attached to the flowtube 12 proximate a corresponding first or second end 12, 14. In this manner, the counterbalance beam 18 is vibrationally coupled to the flowtube 12 such that the reaction forces from each will be combined in the couplings 24. The counterbalance beam 18 is preferably a metallic tube similar in stiffness and density to that of the flowtube 12. The couplings 24 are preferably metal blocks that are brazed or welded to both the flowtube 12 and the counterbalance beam 18.

While not necessarily a part of the present invention, the flowmeter 10 also includes a main force driver $26_F$ connected between the flowtube 12 and the counterbalance beam 18 at the longitudinal center CL of the flowtube. The main force driver $26_F$ generates periodic forces between the flowtube and the counterbalance beam as necessary to vibrate the flowtube at its natural frequency in, for example, its $1^{st}$ bending mode of vibration. The flowmeter 10 may also include one or more reference drivers $26_R$ connected between the flowtube 12 and the counterbalance beam 18 on either side of the main force driver $26_F$. The reference drivers $26_R$ generate reference forces between the flowtube and the counterbalance beam as necessary to determine the sensitivity of the flowtube 12, as is well known in the art. The main force driver $26_F$ and the reference drivers $26_R$ are typically magnet/coil pairs which are excited by currents from the control circuitry which forms a part of the flowmeter 10. The flowmeter 10 will usually also comprise a number of motion sensors or other suitable transducers 28 for measuring the vibratory deflection of the flowtube 12.

Referring still to FIG. 1, the counterbalance apparatus also comprises at least one but preferably two pairs of inertial masses 30 through 36 which are preferably disposed inside the counterbalance beam 18. Each pair of masses is defined about the longitudinal center CL of the counterbalance beam 12 such that the masses 30, 32 form an inner pair and the masses 34, 36 form an outer pair. The outside diameter of each mass 30 through 36 is designed to fit closely within the inside diameter of the counterbalance beam 18 so that the masses will be vibrationally coupled to the counterbalance beam, that is, the vibratory motion of counterbalance beam will force the masses to vibrate at the same amplitude and phase as that of counterbalance beam. Alternatively, a bearing assembly (not shown), for example a needle or roller bearing assembly, may also be provided between each mass and the inside diameter of the counterbalance beam in order to couple each mass to the counterbalance beam while still allowing the masses to move freely along the longitudinal axis of the counterbalance beam.

Referring to FIG. 4, each inertial mass 30 through 36 is preferably a magnetic assembly comprising a cylindrical permanent magnet 38 having axial end faces to which respective annular poles 40 and 42 are attached. The magnet 38 is preferably made of samarium cobalt or alnico alloys, while the poles 40, 42 are ideally made of iron or steel. The poles 40, 42 are optimally designed to direct the magnetic field 44 out to the radial side of the magnet 38, thereby minimizing the portion of the field which is aligned with the longitudinal axis of the counterbalance beam 18. In addition, each inertial mass is preferably oriented so that the adjacent poles of any two adjacent masses have the same polarity (for example, north/south, south/north, north/south, south/north). This will assure that the adjacent masses will repulse each other and not become magnetically attached, since an inordinately large force would be required to separate any such attached pair of masses.

Each mass 30 through 36 preferably also comprises an axial hole 46 extending through the magnet 38 and the poles 40, 42. As will be made apparent hereafter, the hole 46 allows a fluid 48 contained within the counterbalance beam 18 to pass through each inertial mass during repositioning of the mass. To facilitate the passage of the fluid 48 through the mass, the poles 40, 42 preferably comprise beveled ports 50 which communicate with the hole 46. While the masses 30 through 36 could be comprised entirely of iron or steel, the use of a permanent magnet in a magnetic assembly has been found to improve the efficiency of the inertial mass positioning apparatus, which will now be described.

Referring again to FIG. 1, the counterbalance apparatus of the present invention also includes an inertial mass positioning apparatus, which in the preferred embodiment comprises a number of electromagnets 52 through 66 that are mounted along the length of the counterbalance beam 18. The electromagnets are arranged in pairs which are disposed symmetrically with respect to the longitudinal center CL of the counterbalance beam. Furthermore, in the preferred embodiment of the invention each pair of electromagnets is designed to magnetically interact with one of the inertial masses. Thus, electromagnets 52, 54 are designed to interact with mass 30, electromagnets 56, 58 are designed to interact with mass 32, an so on. However, it should be understood that any two electromagnets could be designed to interact with a given mass, provided that positional interference between the masses is avoided. For example, in the absence of mass 34, electromagnets 54, 60 could be chosen to interact with mass 30. By selectively energizing the electromagnets of each pair, the corresponding inertial mass can be controllably positioned along the length of the counterbalance beam 18.

Thus, the positioning of the inertial masses 30 through 36 is accomplished by exciting the electromagnets 52 through 66 as necessary to push, pull, or hold the masses in their desired locations. Since the movement of the masses longitudinally along the counterbalance beam 18 is resisted only by the viscous drag created by the fluid 48, very little force is required from the electromagnets to move the masses. By proper excitation of any pair of electromagnets, a corresponding mass can achieve many positions along the length of the counterbalance beam 18. For example if the mass 30 is aligned with the electromagnet 54, as shown in FIG. 1, it can be held in place by applying an appropriate DC current through the electromagnet 54, for example 10 milliamps, and no current through the electromagnet 52. However, if it is desired to reposition the mass 30 to a position halfway between the electromagnet 54 and the electromagnet 52, then the DC current in the electromagnet 54 would be reduced to 5 milliamps and the DC current in the electromagnet 52 would be increased to 5 milliamps. This will result in the electromagnets 52, 54 exerting equal magnetic forces on the mass 30 which will thus pull the mass into a position halfway between the two electromagnets.

In one embodiment of the inertial mass positioning apparatus, each electromagnet 52 through 66 may be a coil that is wrapped around the counterbalance beam 18. However, the coils are preferably suitably spaced from the counterbalance beam since direct contact with the counterbalance beam could result some vibrational and fatigue problems in the coils In addition, the length of each electromagnet is preferably approximately the same as the length of the inertial masses 30 through 36.

Figure 5:
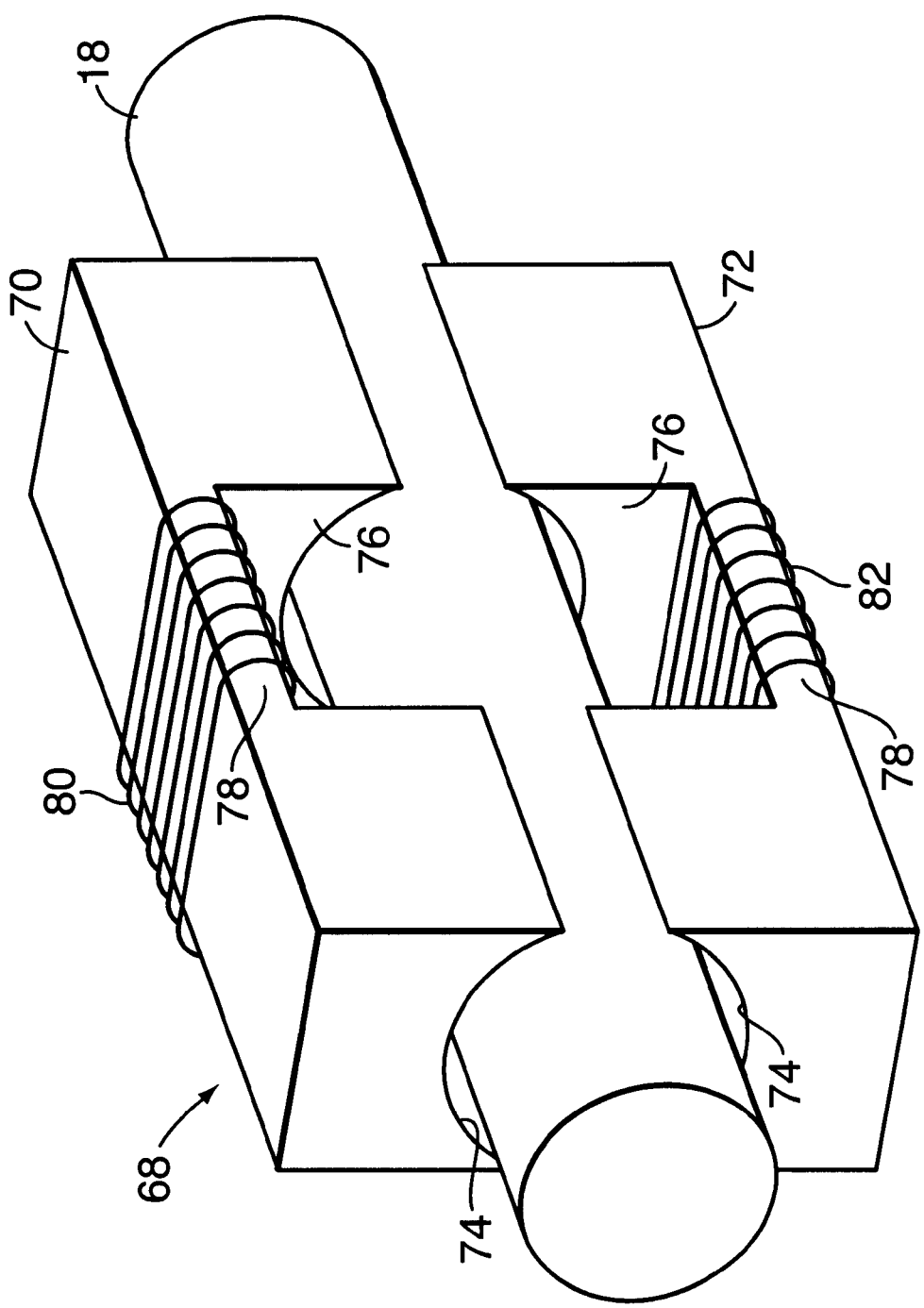
FIG. 5 is a perspective view of one embodiment of the inertial mass positioning apparatus component of the counterbalance apparatus of the present invention.

Referring to FIG. 5, an alternative electromagnet is shown which does not require that the coils be wrapped completely around the counterbalance beam 18, since doing so may limit access to the counterbalance beam. In this embodiment, the electromagnet 68 is shown to comprise two generally rectangular poles 70 and 72 which each comprise a semi-cylindrical longitudinal recess 74 and a central, preferably rectangular relief 76 defining an axial span 78. When assembled as shown in FIG. 5, the counterbalance beam 18 extends through a hole defined by the opposing recesses 74, and the poles 70, 72 are clamped to the counterbalance beam or secured thereto by any other suitable means. The electromagnet 68 also includes two coils 80 and 82, which are wrapped around the spans 78 of the poles 70 and 72, respectively, to create the requisite electromagnetic fields when energized.

Referring again to FIG. 1, the counterbalance apparatus of the present invention also preferably comprises a center stop 84 located at the longitudinal center CL of the counterbalance beam 18 to prevent the masses 30 and 32 from passing the center or contacting each other. In addition, end stops 86 and 88 are ideally provided at the ends 20 and 22, respectively, of the counterbalance beam 18 to define the travel limit of the masses 30 through 36. The end stops 86, 88 can also act as accumulators for any thermally induced volume changes in the fluid 48. A suitable materials for the center stop 84 and the ends stops 86, 88 is a sponge Viton® closed cell foam. The center stop 84 and the end stops 86, 88 are preferably secured to the inside diameter of the counterbalance beam 18 using an appropriate adhesive.

The fluid 48 is preferably an oil of a prescribed viscosity, such as synthetic oil, silicon oil or the like. The purpose of the fluid 48 is to provide lubrication between the inertial masses 30 through 36 and the counterbalance beam 18. In addition, the fluid 48 provides viscous damping for axial motion of the masses 30 through 36, as determined by the viscosity of the fluid in combination with the diameter of hole 46 in each mass.

The basic operation of the invention will now be described in relation first to a counterbalance beam with a single pair of inertial masses, and second to a counterbalance beam with two pairs of inertial masses, which is the preferred embodiment of the invention. As mentioned above, to achieve the best condition of balance the frequency response of the counterbalance beam should match the frequency response of the flowtube for both the $1^{st}$ and the $2^{nd}$ bending modes of vibration of the flowtube. Thus, the masses should be positioned along the counterbalance beam such that they affect both the $1^{st}$ and the $2^{nd}$ bending modes of vibration in a constant or prescribed manner to thereby match a constant or prescribed frequency response of the flowtube. In this manner, the reaction forces from the counterbalance beam will be equal and opposite the reaction forces from the flowtube, thereby resulting in a balanced condition between the counterbalance beam and the flowtube.

Referring to FIG. 2A, the counterbalance beam 18 is shown deflected in its $1^{st}$ bending mode of vibration, which is characteristic of the driven mode of vibration of the flowtube for the preferred embodiment of the invention. A single pair of masses 30, 32 is positioned near the maximum amplitude position of the counterbalance beam 18 (that is, the center of the beam), which is where the inertial masses will have the most influence in lowering the frequency of the counterbalance beam in this $1^{st}$ bending mode shape. In FIG. 2B, the counterbalance beam 18 is shown in a $2^{nd}$ bending mode of vibration, which is characteristic of the Coriolis deflection of the flowtube when it is driven in its $1^{st}$ bending mode of vibration. In this Figure the single pair of inertial masses 30, 32 is positioned near the maximum amplitude positions of the counterbalance beam 18 (that is, approximately 0.3 and 0.7 along the length of the counterbalance beam), which is where the inertial masses will have the most influence in lowering the frequency of the counterbalance beam in this $2^{nd}$ bending mode shape.

For the single pair of inertial masses 30, 32 shown in FIGS. 2A and 2B, FIG. 3 graphs the relationships between the natural frequency of the $1^{st}$ bending mode of vibration of the counterbalance beam (curve 90), the natural frequency of the $2^{nd}$ bending mode of vibration of the counterbalance beam (curve 92), and the frequency response of the counterbalance beam (curve 94), as a function of the symmetrical position of the masses 30, 32 relative to the centerline CL. Curve 90 indicates that with the masses positioned symmetrically near the ends of the counterbalance beam, the $1^{st}$ bending mode frequency is at its highest value, and as the masses are moved toward the center of the counterbalance beam, that frequency declines to its lowest value in a non-linear fashion. Similarly, curve 92 indicates that with the masses positioned symmetrically near the ends of the counterbalance beam, the $2^{nd}$ bending mode frequency is at its highest value, and as the masses are moved toward the center of the counterbalance beam, that frequency declines to a minimum value part-way between the ends and the center in a non-linear fashion.

Thus, the masses 30, 32 affect both the $1^{st}$ and the $2^{nd}$ bending mode frequencies, but by different amounts depending on their position. Therefore, a relationship between the position of the masses and the $1^{st}$ and $2^{nd}$ bending mode frequencies can be determined and used to position the masses in order to maintain a prescribed or constant relationship between the $1^{st}$ and $2^{nd}$ frequencies. By maintaining this prescribed or constant relationship between the two modes of vibration, the frequency response of the counterbalance beam can be matched to the frequency response of the flowtube to thereby maintain the condition of balance between the flowtube and the counterbalance beam.

A frequency response value for the counterbalance beam 18 which is closely related to the sensitivity of the flowmeter 10 can be calculated from the frequencies of the $1^{st}$ and $2^{nd}$ bending modes as follows:

$$\text{Frequency Response}=1/[1-(\Omega_1^{-2}/\Omega_2^{-2})], \quad [1]$$

where $\Omega_1$=the $1^{st}$ bending mode frequency and $\Omega_2$=the $2^{nd}$ bending mode frequency. Curve 94 of FIG. 3 is a plot of this frequency response value as a function of the symmetrical position of the masses 30, 32. Inspection of curve 94 indicates that the frequency response of the counterbalance beam is highly non-linear and non-constant, changing over 10% for the values shown. This is due to the ratio of the two frequencies $\Omega_1$ and $\Omega_2$ not being a constant function of mass position.

For signal processing methods that determine the frequency response or sensitivity of the flowmeter directly by the application of reference forces, such as explained in U.S. Pat. No. 5,907,104 issued to Cage et al., a counterbalance apparatus comprising a single pair of masses 30, 32 is sufficient since changes in the frequency response value due to changes in fluid properties can be accurately compensated for. However, for signal processing methods that infer the frequency response or sensitivity of the flowmeter by, for example, calculating changes in the elastic modulus of the flowtube based on temperature changes, changes in the frequency response value can cause changes in flowtube sensitivity which result in flow measurement errors. The present invention can be applied to this situation as hereinafter explained.

To improve this situation, the preferred embodiment of the invention comprises the second pair of inertial masses 34, 36, and the positions of the inner pair of masses 30, 32 are controlled relative to the outer pair of masses 34, 36 so that the ratio of the $1^{st}$ and $2^{nd}$ bending mode frequencies is held to a constant or prescribed relationship, thereby resulting in a constant or prescribed frequency response value for the counterbalance beam.

Figure 8:
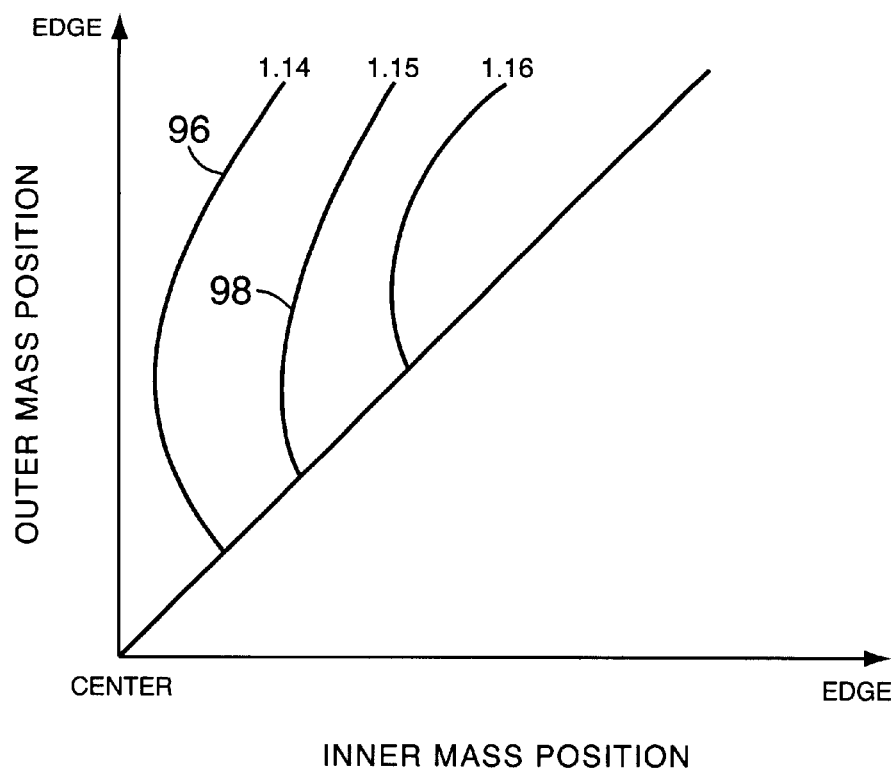
FIG. 8 is a graph of the relationship between the position of the inner inertial mass pair relative to the position of the outer inertial mass pair for several constant values of frequency response of the counterbalance beam.

FIG. 8 graphs the relationship between the positions of the inner mass pair 30, 32 relative to the outer mass pair 34, 36 for several constant values of frequency response. The bottom half of the graph in FIG. 8 is empty since the inner masses 30, 32 cannot pass by and become the outer masses 34, 36. The curve 96 therefore represents a line of constant frequency response value of 1.14 and indicates the corresponding positions of the inner mass pair 30, 32 and the outer mass pair 34, 36 over a range of values that would correspond to a range of $1^{st}$ and $2^{nd}$ bending mode frequencies. Similarly, the curve 98 represents the same relationship but for a constant frequency response value of 1.15, and so on. By positioning the inner mass pair 30, 32 with respect to the outer mass pair 34, 36 according to a given curve on FIG. 8, for example curve 96, a constant frequency response value can be achieved over a range of frequencies, thereby achieving the best condition of balance. Inspection of FIG. 8 reveals that following a constant frequency response value, for example curve 96, may require moving the mass pairs toward each other for some values and away from each other for other values.

The determination of the optimal balance condition between the flowtube 12 and the counterbalance beam 18, and thus whether to reposition the inertial masses 30 through 36 for a given set of operating conditions, can be based on many different factors. For the exemplary design of the preferred embodiment of the invention, the optimization criteria could be the "drive efficiency" of the flowmeter 10. As previously discussed, a condition of unbalance results in energy being lost to the supporting structure and the other components of the flowmeter. Therefore, a value for drive efficiency of the flowmeter can be the power required to maintain a given flowtube vibration amplitude, and this value can be minimized as the optimization parameter.

Figure 6:
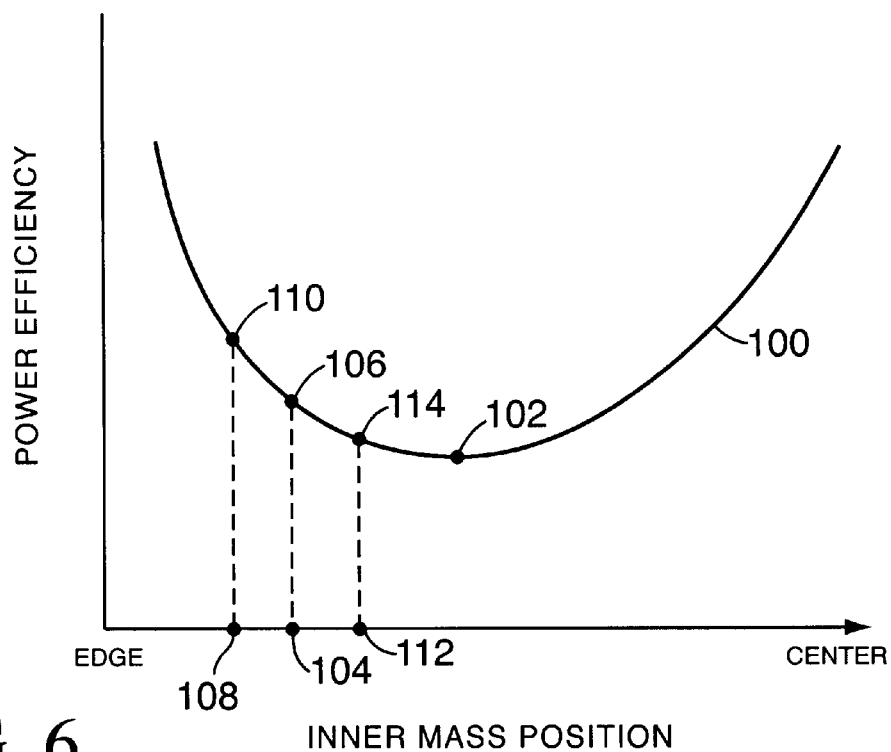
FIG. 6 is a graph of the relationship between the position of the inner inertial mass pair and the drive power efficiency of the flowmeter.

FIG. 6 depicts one possible exemplary relationship between this drive efficiency parameter and the symmetrical position of the inner mass pair 30, 32 relative to the center CL of the counterbalance beam for a given design and set of fluid conditions. From the previous discussion the corresponding position of the outer mass pair 34, 36 can subsequently be determined from FIG. 8. The drive efficiency curve 100 indicates that the relationship is a $2^{nd}$ order curve having a local minimum at a given mass position indicated by point 102. The drive efficiency minimum point 102 is the desired operating situation, but in practice the curve 100, along with its minimum point 102, can shift right or left depending on the parameters of a particular fluid, such as density. Therefore a method to decide whether to reposition the masses 30 and 32 (and subsequently the masses 34 and 36) can be employed to determine the optimal balance condition for the flowmeter 10.

One method to determine whether to reposition the masses 30 through 36 is simply to test certain positions of the inner mass pair 30, 32 on either side of their current position to see if the drive efficiency improves or worsens. For example if a given inner mass pair position 104 results in a drive efficiency value indicated by point 106 on curve 100, and by repositioning the inner mass pair to position 108 (and subsequently the outer mass pair 34, 36 to its new position) the drive efficiency is determined to go up to the value indicated by point 110, then the move from position 104 to 108 was in the wrong direction. Similarly, if by moving to inner mass pair position 112 a lower drive efficiency value indicated by point 114 is achieved, then this move is in the right direction. By continuing this process of testing inner mass pair positions left and right of the current inner mass pair position, the minimum drive efficiency value indicated by point 102 can be found and tracked continuously over changing fluid parameters.

Another method to determine the optimal balance condition between the flowtube 12 and the counterbalance beam 18 is to use the ratio of the flowtube vibration amplitude to the counterbalance beam vibration amplitude, since this ratio should remain relatively constant (or follow a known algorithm involving temperature or other parameters) at optimal balance. For example, an increase in the density of the fluid in the flowtube 12 would require a similar addition of inertial mass effect to the counterbalance beam 18 (for example, by moving the inertial masses toward higher amplitude regions) to maintain the vibration amplitude ratio at its original value. By monitoring these two vibration amplitudes during operation of the flowmeter 10, the vibration amplitude ratio can be held constant (or held to follow some known algorithm) with an electronic servo which repositions the inertial masses according to a prescribed algorithm.

Figure 7:
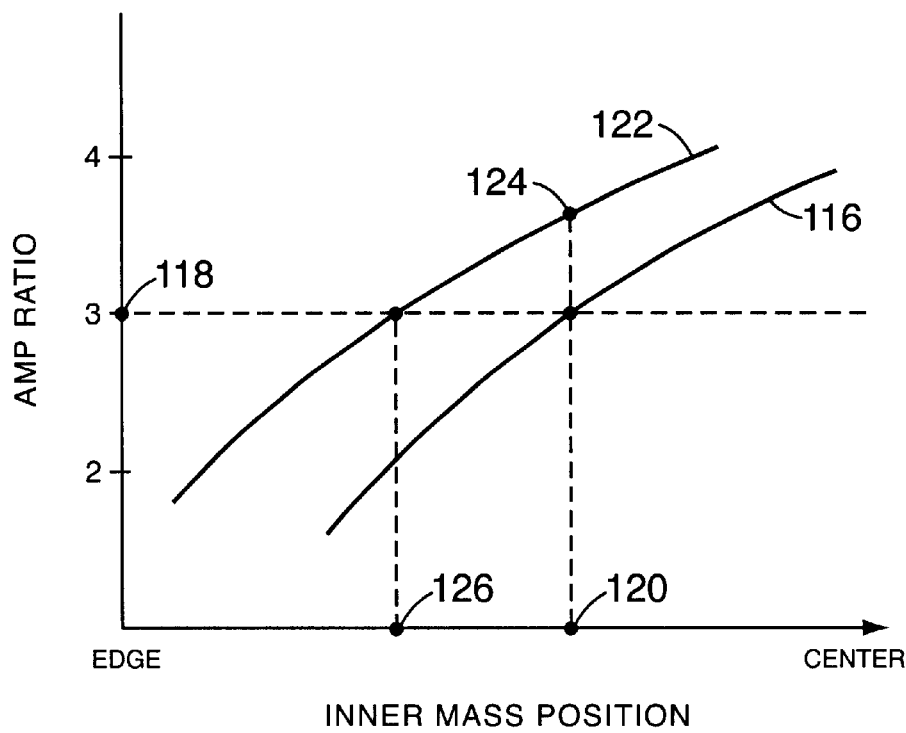
FIG. 7 is a graph of the relationship between the position of the inner inertial mass pair and the vibration amplitude ratio of the flowtube to the counterbalance beam.

FIG. 7 depicts one possible relationship between this vibration amplitude ratio as a function of the symmetrical position of the inner mass pair 30, 32. Curve 116 depicts this relationship for an exemplary fluid condition. The amplitude ratio value indicated by point 118 can be predetermined through calibration to be the optimum balance condition, and for this example this value intersects curve 116 at a mass position indicated by point 120. If the parameters of the fluid should change, for example if the fluid becomes less dense, curve 116 could shift to the position of curve 122. Should this occur, the calculated value for the amplitude ratio would go up to a value indicated by point 124 on curve 122 at the mass position 120. This change would be detected by the servo, and since the curve has a positive slope within the depicted range the servo would know to reposition the inner mass pair as necessary to return the amplitude ratio to the optimal target value 118 on curve 122, which for this example would occur at a mass position 126.

These methods for determining and achieving the optimal balance between the flowtube 12 and the counterbalance beam 18 can be employed in conjunction with the present invention, but are not a necessary part of the invention.

The previous discussion assumed that the inertial mass pairs 30, 32 and 34, 36 are positioned symmetrically about the center CL of the counterbalance beam 18. However, in the preferred embodiment of the invention non-symmetrical effects can also be corrected, as will now be discussed. If the flowmeter 10 shown in FIG. 1 is mounted vertically, gravity will tend to reposition the masses 30 through 36 slightly and thereby cause a non-symmetrical balance. Similarly, the boundary conditions of the flowtube can also become non-symmetrical and thereby cause a non-symmetrical balance. This non-symmetrical balance can effect the performance of the flowmeter 10, primarily the zero stability.

To alleviate this problem, motion sensors 28 can be used to compare the amplitude of the vibration on the inlet of the flowtube with the amplitude of the vibration on the outlet of the flowtube. If these amplitudes are unequal, which indicates a condition of non-symmetrical balance, the masses 30 through 36 can be repositioned slightly left or right of their previously determined nominal positions to re-establish a symmetrical balanced condition. Moreover, a second servo loop can be incorporated into the mass position logic discussed above to non-symmetrically re-position the masses 30 through 36 left or right relative to their nominal symmetrical positions in order to re-establish the symmetry between the inlet and the outlet of the flowtube.

Instead of moving the inertial masses 30 through 36 to exact locations long the counterbalance beam 18, the positioning of the masses has thus far been discussed in terms of repositioning the masses with an active feed back using signals such as drive efficiency or vibration amplitude ratio. However, the present invention can also be used to move the masses to exact locations, thus allowing for other methods of repositioning logic to be employed, as will now be discussed.

Since the inductance of the coil in a given electromagnet 52 through 66 will be altered by the proximity of a mass 30 through 36, the exact locations of all the masses can be determined by measuring the inductance of each coil. Therefore, if a mass positioning scheme is used which depends on the exact locations of the masses 30 through 36 along the counterbalance beam 18, the inductance values can be determined and used for repositioning the masses, if necessary. For example, since DC currents are normally be used to push, pull or hold a given mass in its intended location, a small AC current can easily be superimposed on top of the DC current. Furthermore, the voltage across an inductor is determined by the following well known relation:

$$\text{Coil Voltage} = L \; dI/dt, \tag{2}$$

where L=the inductance of the coil and dI/dt=the rate of change of coil current with respect to time. Thus, since the inductance will be proportional to the proximity of the mass to the coil, by measuring the inductance L in each coil of the electromagnets 52 through 66, the position of each mass can be accurately determined and used as a feedback parameter for a mass positioning algorithm.

Figure 9:
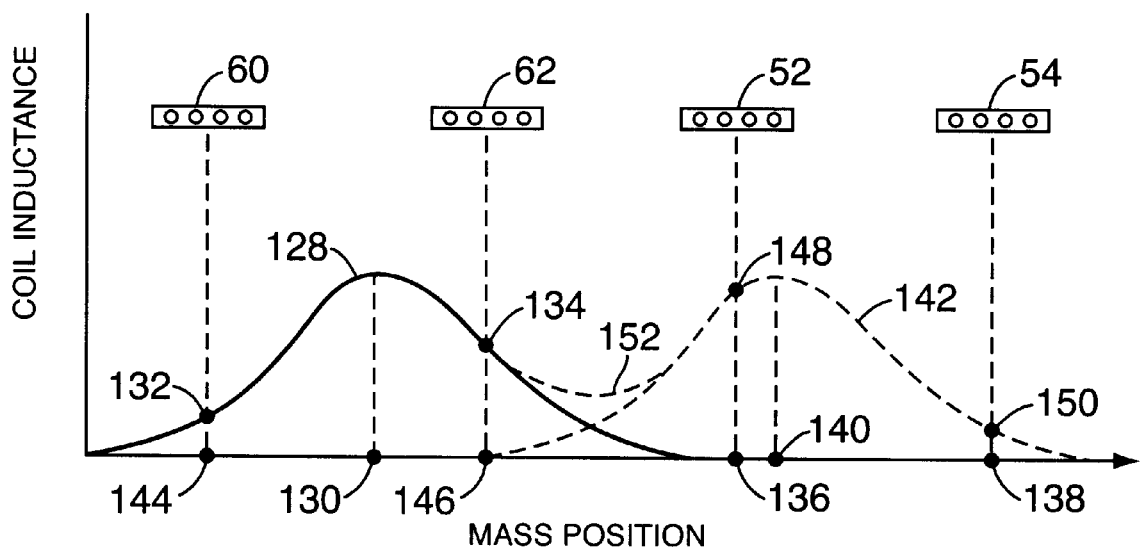
FIG. 9 is a graph of the possible relationship between the measured coil inductance of the inertial mass positioning apparatus as a function of the position of the inertial mass.

FIG. 9 graphs the possible relationships between measured coil inductance as a function of mass position for two different mass positions (for example, of mass 30) and four nominally spaced coils, in this example the coils of electromagnets 60, 62, 52 and 54. The curve 128 represents the continuous inductance versus mass position relationship of the mass at location 130. Since for this example we have four discrete coils 60, 62, 52 and 54, four discrete inductance values can be measured for the mass location 130, those values being indicated by points 132, 134, 136 and 138, respectively. Similarly, if the mass is repositioned to location 140, the curve 142 would represent the continuous inductance versus mass position relationship, and coils 60, 62, 52 and 54 would then measure discrete inductance values 144, 146, 148 and 150, respectively. Simple curve fitting techniques can then be used to fit the four measured inductance values to the known curve shape of curve 128 or curve 142 to solve for the mass position 130 or 140, respectively.

In a similar fashion, if two masses (for example masses 30 and 34) are proximate each other, their individual inductance versus position curves 128 and 142 would then combine to form a curve 152 which is the sum of curves 128 and 142, and here again simple curve fitting algorithms can be used to determine the exact positions of the masses.

Figure 10:
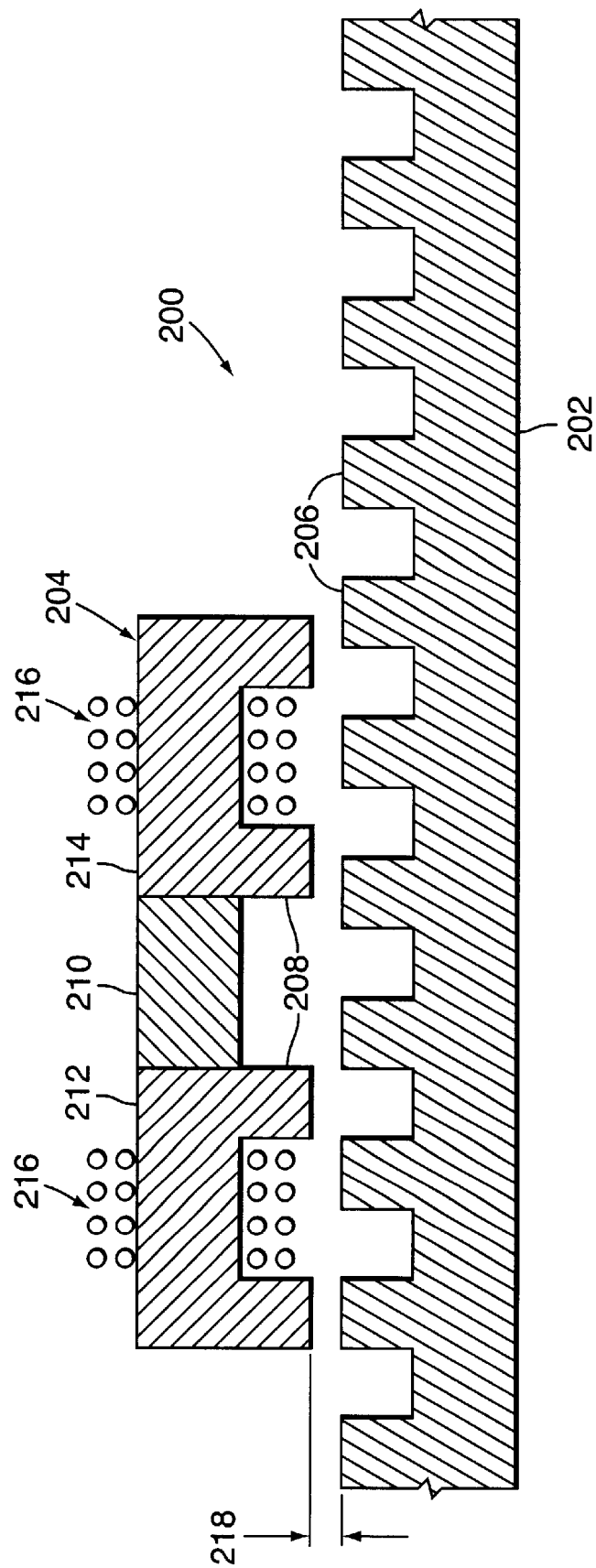
FIG. 10 is a partial cross-sectional view of another embodiment of a counterbalance apparatus according to the present invention.

Another embodiment of a counterbalance apparatus according to the present invention is illustrated in FIG. 10. In this embodiment, the counterbalance apparatus, which is indicated generally by reference number 200, is designed to work on the principle of a linear stepper motor. Accordingly, the counterbalance apparatus 200 comprises a counterbalance beam 202, which functions as the platen of a stepper motor, and a number of inertial masses 204 (only one of which is shown in FIG. 10), which are the "forcers" that are capable of being repositioned along the length of the counterbalance beam 202. In addition, the counterbalance beam 202 includes a number of "teeth" 206 that interact magnetically with corresponding teeth 208 on each mass 204. The counterbalance beam 202 is coupled to the flowtube of the flowmeter (not shown) in a manner described above and is designed to vibrate in its $1^{st}$ bending mode of vibration.

Each mass 204 preferably comprises a permanent magnet 210 sandwiched between a pair of poles 212, 214. In addition, a coil 216 is wrapped around each pole 212, 214. As is well known in the art of linear stepper motors, proper excitation of the coils 216, together with the magnetic field from permanent magnet 210, will generate electromagnetic forces between the teeth 206 of the counterbalance beam 202 and the teeth 208 of the mass 204 which will hold or reposition the mass in one direction or the other along the length of the counterbalance beam 202. Therefore, as was the case for the embodiment of the invention discussed above, two pair of masses could be used in conjunction with the counterbalance beam 202 and positioned as before to achieve a condition of balance between the flowtube and the counterbalance beam. As is known in the art of stepper motors, the mass 204 can achieve any position along the length of the counterbalance beam 202 by "micro-stepping" the mass through appropriate excitation the coils 216. The counterbalance apparatus may also include mechanical bearings (not shown) to maintain a close gap 218 between the teeth of the mass 204 and the teeth of the counterbalance beam 202.

In addition to the embodiments of the inertial mass positioning apparatus described above, other similar apparatus may also be used. For example, a lead screw can be used to position one or more threaded inertial masses along a counterbalance beam. In this embodiment, the lead screw could be disposed inside a tubular counterbalance beam, or the lead screw could constitute the counterbalance beam. Also, each inertial mass can comprise a piezoelectric "inchworm" linear motor which can be activated to position itself along a suitable counterbalance beam. According to another embodiment, each inertial mass can comprise a piston which is propelled into position within a tubular counterbalance beam by a controlled pressure.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A Coriolis-type mass flowmeter which comprises:
   a flowtube through which a fluid to be measured is permitted to flow, the flowtube comprising first and second ends;
   a counterbalance beam which is coupled to the flowtube proximate the first and second ends;
   means for vibrating the flowtube and the counterbalance beam in opposition to one another;
   at least one pair of inertial masses, each of which is movably coupled to the counterbalance beam; and
   means for selectively positioning the inertial masses longitudinally along the counterbalance beam;
   wherein the frequency response of the counterbalance beam can be selectively altered by appropriately positioning the inertial masses along the counterbalance beam to thereby achieve a desired condition of balance between the counterbalance beam and the flowtube.

2. The flowmeter of claim 1, wherein the counterbalance beam comprises an elongated tube and each inertial mass is slidably disposed within the tube.

3. The flowmeter of claim 2, wherein each inertial mass is comprised of a metallic material and the positioning means comprises a plurality of electromagnets positioned along the tube.

4. The flowmeter of claim 3, wherein each inertial mass comprises a permanent magnet.

5. The flowmeter of claim 3, further comprising a fluid disposed in the tube for providing a desired degree of resistance to movement of the inertial masses within the tube.

6. The flowmeter of claim 1, wherein the counterbalance beam comprises a platen, each inertial mass comprises a forcer, and the positioning means comprises the platen and the forcers.

7. The flowmeter of claim 6, wherein each forcer comprises a permanent magnet mounted between two metallic poles.

8. A counterbalance apparatus for a Coriolis-type mass flowmeter having a flowtube through which a fluid to be measured is permitted to flow, the flowtube including first and second ends, the counterbalance apparatus comprising:
   a counterbalance beam which is coupled to the flowtube proximate the first and second ends;
   means for vibrating the flowtube and the counterbalance beam in opposition to one another;
   at least one pair of inertial masses, each of which is movably coupled to the counterbalance beam; and
   means for selectively positioning the inertial masses longitudinally along the counterbalance beam;
   wherein the frequency response of the counterbalance beam can be selectively altered by appropriately positioning the inertial masses along the counterbalance beam to thereby achieve a desired condition of balance between the counterbalance beam and the flowtube.

9. The counterbalance apparatus of claim 8, wherein the counterbalance beam comprises an elongated tube and each inertial mass is slidably disposed within the tube.

10. The counterbalance apparatus of claim 9, wherein each inertial mass is comprised of a metallic material and the positioning means comprises a plurality of electromagnets positioned along the tube.

11. The counterbalance apparatus of claim 10, wherein each inertial mass comprises a permanent magnet.

12. The counterbalance apparatus of claim 10, further comprising a fluid disposed in the tube for providing a desired degree of resistance to movement of the inertial masses within the tube.

13. The counterbalance apparatus of claim 8, wherein the counterbalance beam comprises a platen, each inertial mass comprises a forcer, and the positioning means comprises the platen and the forcers.

14. The counterbalance apparatus of claim 13, wherein each forcer comprises a permanent magnet mounted between two metallic poles.

15. A method for balancing a Coriolis-type mass flowmeter having a flowtube through which a fluid to be measured is permitted to flow, the flowtube including first and second ends, the method comprising:

coupling a counterbalance beam to the flowtube proximate the first and second ends;

vibrating the flowtube and the counterbalance beam in opposition to one another;

providing at least one pair of inertial masses, each of which is movably coupled to the counterbalance beam; and selectively positioning the inertial masses longitudinally along the counterbalance beam to achieve a desired condition of balance between the counterbalance beam and the flowtube.

16. The method of claim 15, further comprising:

determining an optimum value for the drive efficiency of the flowmeter; and selectively positioning the inertial masses to maintain the drive efficiency of the flowmeter near the optimum value.

17. The method of claim 15, further comprising:

measuring the amplitude of the vibration of the flowtube;

measuring the amplitude of the vibration of the counterbalance beam;

determining a ratio of the flowtube vibration amplitude to the counterbalance beam amplitude; and selectively positioning the inertial masses to maintain the ratio nearly constant.

18. The method of claim 15, further comprising:

providing a plurality of electromagnets;

wherein the step of selectively positioning the inertial masses comprises selectively energizing the electromagnets.

19. The method of claim 18, further comprising:

determining the inductance of each electromagnet; and determining the position of each inertial mass from the inductance of each electromagnet.

\* \* \* \* \*